No. 631,451. Patented Aug. 22, 1899.
H. K. WOOD.
MEAT CUTTER.
(Application filed Nov. 12, 1898.)
(No Model.)
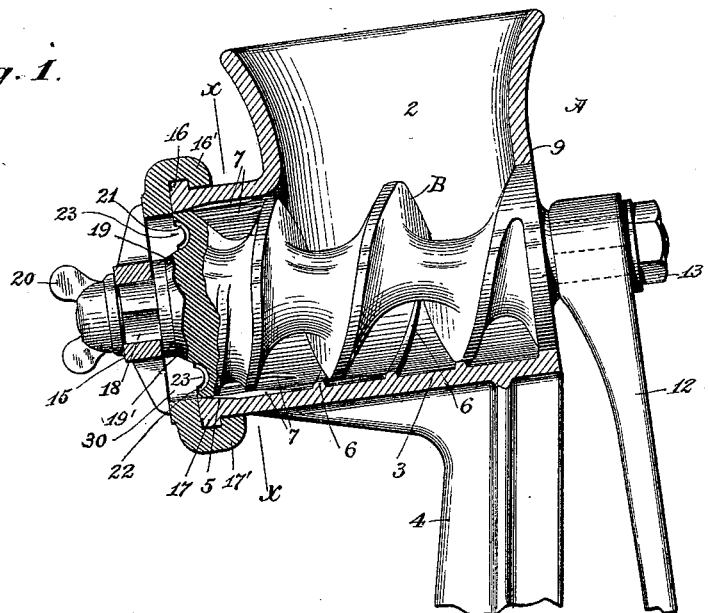
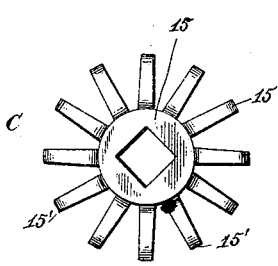
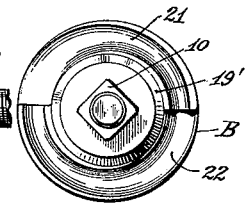
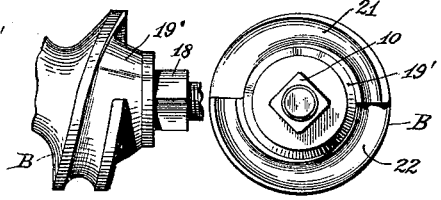
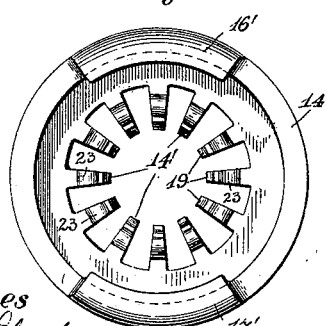
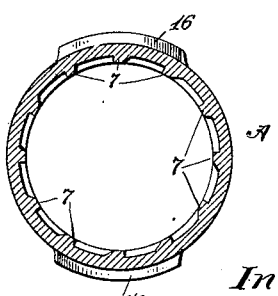
Witnesses
Inventor
H. K. Wood,
By his Attorney

UNITED STATES PATENT OFFICE.

HUBERT K. WOOD, OF HARTFORD, CONNECTICUT.

MEAT-CUTTER.

SPECIFICATION forming part of Letters Patent No. 631,451, dated August 22, 1899.

Application filed November 12, 1898. Serial No. 696,223. (No model.)

*To all whom it may concern:*

Be it known that I, HUBERT K. WOOD, a citizen of the United States, residing in Hartford, in the county of Hartford and State of Connecticut, have invented certain new and useful Improvements in Meat-Cutters, of which the following is a specification.

This invention relates to meat-cutters; and the object of the invention is to provide a simple device of this character in which the proper cutting of the meat and the retention of the juice or essence are assured; and the device consists of a minimum number of detachable parts so mounted as to be quickly separated from each other and from the casing for the purpose of cleaning said parts.

My improved meat-cutter is adapted equally well for dividing many other kinds of food, and it involves in its organization a casing or shell consisting of a cylindrical portion and a communicating transverse hopper and a feed-screw located in said cylindrical portion. The hopper is adapted to receive the meat to be operated upon, which falls against and is advanced by said feed-screw for treatment by the cutter mechanism, which includes, preferably, two sections fixed, respectively, to the forward end of the casing and to the feed-screw. The cylindrical portion of the casing or that part thereof inclosing or surrounding the feed-screw is inclined, whereby any juice which may be extracted from the meat at any point in the length of the feed-screw may flow down the incline to the forward end of the casing, said casing being slightly tapered or concaved at its forward end to receive and momentarily retain the expressed juice to enable it to be absorbed by the particles of meat.

My improved meat-cutter involves as one of its essential features a feed-screw having in its forward end face a groove or grooves of varying width and depth, with which groove or grooves projections or protuberances on the fixed cutter-section coöperate, as will be hereinafter described, and said screw or a stud thereon projects beyond the rear end of the casing and is provided with a suitable handle, by which it may be turned to advance the meat for treatment by the cutting mechanism.

Before the meat reaches the main cutter, hereinbefore mentioned, it is shredded or coarsely divided by a primary cutting device, which in the example shown consists of a series of ribs in the forward end of the casing, and the pieces thus cut form into a mass which is forced between the forward end of the casing and the feed-screw and is then passed to the final cutting device.

Particular attention is directed to the fact that bosses or protuberances, hereinafter described, are formed on the radial fingers or teeth of the fixed cutter-section carried by the cap placed over the end of the casing and that these bosses or protuberances by entering the groove or grooves in the outer end of the feed-screw and coming in contact with the meat forced therein by the action of the main part of said screw serve not only to clear the grooves, but as retarding devices or abutments to prevent the rotation of the meat in said grooves with the screw. Said bosses also serve to deflect the meat or other material through the spaces between said fingers, which act in connection with said screw as primary cutting devices. These protuberances and fingers also act to divide the meat into sections, cubes, or separate particles, which are more readily acted upon by the final cutting devices, whereby the meat is more easily cut and is much better divided than in the old forms of construction.

In the drawings accompanying and forming part of this specification, Figure 1 is a longitudinal central section of my improved meat-cutter. Fig. 2 is an inside face view of the fixed cutter-section. Fig. 3 is a cross-section taken in the line *x x*, Fig. 1, looking toward the left, with the feed-screw and the two cutter-sections removed. Fig. 4 is a face view of the rotary cutter-section. Fig. 5 is a similar view of the feed-screw, and Fig. 6 is a detail hereinafter specifically described.

Similar characters designate like parts in all the figures of the drawings.

My improved meat-cutter involves a casing, as A, having a hopper, as 2, in which the meat to be cut is placed, and a cylindrical portion 3, communicating therewith and from which a foot or standard 4 depends, the latter being usually provided with means (not shown) for fastening it to a table.

The cylindrical portion 3 of the casing serves to receive the forcing device, consisting in the present case of a feed-screw B, and said cylindrical portion is made inclined, as clearly represented in Fig. 1, and slightly tapered or concaved, as at 5, near its forward end. By this construction any juice which may be extracted from the meat back of the concavity 5 may freely run down the incline and into said concavity, where of course it may be absorbed by the cut material.

The interior of the cylindrical portion 3 is provided with a series of spirally-arranged ribs 6, which coöperate with the feed-screw in forcing the material forward through said casing, and also with a series of cutting-ribs 7, which effect a preliminary cutting of the meat, that is finally acted upon by a main cutter, as C, hereinafter more particularly described.

The rear end 8 of the feed-screw B is supported in a suitable bearing, as 9, in the rear wall of the casing and has a squared stud 10 adapted to receive the similarly-shaped end of the handle 12, which is held in place by a nut 13 in threaded engagement with said stud.

As just stated, the ribs 7 serve to effect a preliminary reduction of the meat, the coarsely-separated pieces being finely divided by the main cutter C, which consists of two sections 14 and 15, respectively, the cutting edges of which are in the same plane and transverse to the axis of the feed-screw B. Said cutter-sections are detachably secured, respectively, to the casing and feed-screw, it being apparent, therefore, that the section 14 is stationary, while the section 15 is rotative relatively thereto, and each of these parts includes a series of radial cutting-fingers, as 14' and 15', the meat being divided by the joint action of the two series of cutting-fingers.

The front end of the cylindrical portion of the casing is provided upon its upper and lower sides, respectively, with spiral ribs 16 and 17, adapted to enter similarly-shaped channels in the overhanging flanges or hooks 16' and 17', respectively, upon the rear side of the fixed cutter-section 14. To mount the latter, it is first placed over the stud 18 on the front end of the feed-screw B and slid therealong until it abuts against the front end of the casing, it being of course understood that the spiral ribs 16 and 17 are out of line with the coöperating flanges 16' 17', after which said part is turned, and the ribs 16 and 17 are thereby shifted into their seats in the two flanges, the said cutter-section being turned until it is locked tightly in place. Said cutter-section serves also as a partial bearing for the front end of the feed-screw, it being provided with an angular or beveled annular seat 19, against which bears the similarly-shaped continuous surface 19' of the feed-screw, as shown in Fig. 1, this construction preventing wabbling or displacement of said feed-screw.

The rotary cutter-section 15 fits over the stud 18, the engaging portions of the two parts being squared and the cutter being held against endwise movement by a winged nut 20 in threaded engagement with said stud. The cutter-section 15 works against the fixed cutter-section 14, and, as before stated, each has a series of radial fingers or teeth 14' and 15', respectively, the meat particles which are separated by the cutting-ribs 7 being forced by the feed-screw between the fingers or cutters 14' of the fixed cutter-section, where they can be cut by the fingers 15' of the rotating cutter-section.

The outer end of the feed-screw has two communicating grooves 21 and 22, respectively, substantially concentric to the axis of the feed-screw, in which grooves the bosses or protuberances 23, formed on the cutting-fingers of the fixed cutter-section, are intended to work. (See Figs. 1 and 2.)

Before the meat reaches the main cutter C it is shredded or coarsely divided by the primary cutter, consisting of the series of ribs 6 and 7 on the under side of the casing, and the coarsely-divided mass is forced forward and into the communicating grooves 21 and 22 on the outer end of the feed-screw and is thereafter forced to the final or main cutting device.

The bosses or protuberances 23 fit into the two grooves and on the rotation of the feed-screw come in contact with the meat and serve to prevent the rotation of the same with the feeder B and to clear the grooves and to deflect the meat in separated particles or cubes through the spaces between the cutting-fingers 14' and 15', so the said meat can be further separated.

To prevent the meat from packing or clogging in the grooves, the latter are of varying depths and widths throughout their lengths, and the bosses or protuberances 23 serve, as above stated, to clear the grooves and to force the meat to enter the spaces between the cutting-fingers, which spaces are enlarged, preferably, at the top to cause the meat to be forced in that direction.

The cutting-fingers 14' have on their inner sides and near the free ends thereof the beveled portions 19, with which the correspondingly-beveled portion 19', adjacent to the stud or extension 18 of the feed-screw B, is in bearing contact. Deep spaces 30 are formed between the several cutting-fingers, as indicated clearly in Figs. 1 and 2, and each of these spaces is preferably wider at one end than at the other end and is in the nature of a "clearance-space," in which the cut and separated particles of the material being operated upon will find sufficient room to expand or spread apart, whereby they will be severed by the final or main cutter C without danger of being mashed or ground. As shown in the figures mentioned, the beveled portion 19' of the feed-screw adjacent to the stud 18 thereof has an upward inclination, in virtue of which said portion acts as a wedge to force the particles of meat or other material in contact therewith into the enlarged parts of the spaces 30, whereby all tendency of the material being operated upon to clog or bind with its particles in close relation is practically eliminated, and the material in a loose expanded condition is delivered to the final cutter C, which severs the same without danger of mashing or grinding it. As will readily be seen, this construction is of importance and avoids the objection heretofore found in many classes of meat-cutters, in which, during the final cutting action, the particles of material are not separated by what may be termed a "clean cut."

Having described my invention, I claim—

1. In a machine of the class specified, the combination with a casing, of a forcer located therein and having a groove of varying width and depth in its front face; means entering said groove and serving to deflect the material; and a cutter for finally severing such material.

2. In a meat-cutter, the combination, with a casing, of a feed-screw having its forward end face grooved; and a device on the casing having a boss or projection disposed in the groove and coöperating therewith, substantially as and for the purpose specified.

3. In a meat-cutter, the combination, with a casing, of a feed-screw having a groove or grooves in its forward end face, and a cutter consisting of two members fixed, respectively, to the feed-screw and casing, the cutter-section carried by the casing being provided with a series of bosses fitted in said groove or grooves.

4. In a meat-cutter, the combination, with a casing, of a feed-screw having in its forward end face grooves each of which is of varying width and depth throughout its length, and a cutter consisting of two sections fixed, respectively, to the feed-screw and the casing, the section carried by the casing being provided with a series of bosses disposed in said grooves.

5. In a device of the class specified, the combination, with a casing, of a cutter carried thereby having a series of fingers, each provided with a beveled portion, the beveled portions being at the free ends of said fingers, and the spaces between the fingers being enlarged at one end; a forcer having a groove in its end face and having a correspondingly-beveled portion in bearing contact with the beveled portions of said fingers; and a device for removing material from said groove in the forcer.

6. In a meat-cutter, the combination with a casing, of a feed-screw therein having a groove in its forward end face, said groove being of varying width and depth; and a device having one or more bosses disposed in said groove.

HUBERT K. WOOD.

Witnesses:
  HEATH SUTHERLAND,
  CHAS. F. SCHMELZ.